United States Patent
Mansell et al.

(10) Patent No.: US 9,719,772 B2
(45) Date of Patent: Aug. 1, 2017

(54) FIBER OPTIC SYSTEM FOR SENSING THE POSITION OF A HYDRAULIC ACCUMULATOR PISTON

(71) Applicant: TELEDYNE SCIENTIFIC & IMAGING, LLC, Thousand Oaks, CA (US)

(72) Inventors: John E. Mansell, Thousand Oaks, CA (US); Milind Mahajan, Thousand Oaks, CA (US); Graham J. Martin, Woodland Hills, CA (US)

(73) Assignee: TELEDYNE SCIENTIFIC & IMAGING, LLC, Thousand Oaks, CA (US)

(*) Notice: Subject to any disclaimer, the term of this patent is extended or adjusted under 35 U.S.C. 154(b) by 0 days.

(21) Appl. No.: 14/869,568

(22) Filed: Sep. 29, 2015

(65) Prior Publication Data

US 2016/0018210 A1    Jan. 21, 2016

Related U.S. Application Data

(62) Division of application No. 13/441,272, filed on Apr. 6, 2012, now abandoned.

(51) Int. Cl.
*G01B 9/02* (2006.01)
*G01B 11/14* (2006.01)
(Continued)

(52) U.S. Cl.
CPC ....... *G01B 9/02049* (2013.01); *G01B 9/0201* (2013.01); *G01B 9/02002* (2013.01);
(Continued)

(58) Field of Classification Search
CPC .............. G01B 9/0201; G01B 9/02015; G01B 9/02002; G01B 11/026; G01B 11/14;
(Continued)

(56) References Cited

U.S. PATENT DOCUMENTS 4,643,577 A * 2/1987 Roth .................... G01B 5/0014
356/498
5,106,192 A * 4/1992 Tucker .................. G01S 17/325
356/477

(Continued)

FOREIGN PATENT DOCUMENTS

CH    WO2010/030884 A2 * 3/2010 ............. G01B 11/14

OTHER PUBLICATIONS

Creath K. Phase-measurement interferometry techniques. Progress in optics. Dec. 31, 1988;26(26):349-93.*

*Primary Examiner* — Michael P Lapage
(74) *Attorney, Agent, or Firm* — Koppel, Patrick, Heybl & Philpott

(57) ABSTRACT

A fiber optic sensing system for determining the position of an object requires a light source, an optical fiber, a fiber optic splitter, a fiber tip lens, an optical detector and signal processing circuitry. Light emitted by the light source is conveyed via optical fiber and the splitter to the lens and onto an object, such that at least a portion of the light is reflected by the object and conveyed via fiber and the splitter to the detector. Signal processing circuitry coupled to the detector determines the position of the object with respect to the lens based on a characteristic of the reflected light. The system is suitably employed with a hydraulic accumulator having a piston, the position of which varies with the volume of fluid in the accumulator, with the system arranged to determine the position of the piston, from which the volume can be calculated.

9 Claims, 4 Drawing Sheets

(51) Int. Cl.
*G01D 5/26* (2006.01)
*G01B 11/02* (2006.01)
*G01D 5/34* (2006.01)
*G01S 17/10* (2006.01)
*G01S 7/481* (2006.01)
*G01S 7/486* (2006.01)

(52) U.S. Cl.
CPC ........ *G01B 9/02028* (2013.01); *G01B 11/026* (2013.01); *G01B 11/14* (2013.01); *G01D 5/266* (2013.01); *G01D 5/268* (2013.01); *G01D 5/34* (2013.01); *G01S 7/4818* (2013.01); *G01S 7/4865* (2013.01); *G01S 7/4868* (2013.01); *G01S 17/10* (2013.01); *G01B 2290/35* (2013.01)

(58) Field of Classification Search
CPC ............ G01B 9/02028; G01B 2290/35; G01S 7/4868; G01S 7/4865; G01S 7/4818; G01S 17/10; G01D 5/268; G01D 5/34; G01D 5/266

USPC ......................................... 356/4.09, 450–521
See application file for complete search history.

(56) References Cited

U.S. PATENT DOCUMENTS

| | | | |
|---|---|---|---|
| 6,724,485 B1* | 4/2004 | Drabarek | G01B 11/303 356/485 |
| 6,839,142 B2* | 1/2005 | Isshiki | G03F 7/70775 356/498 |
| 2005/0057756 A1* | 3/2005 | Fang-Yen | G01B 9/02072 356/497 |
| 2008/0273209 A1* | 11/2008 | Delfyett | G01S 7/487 356/498 |
| 2010/0091265 A1* | 4/2010 | Franz | G01B 11/007 356/51 |
| 2011/0205523 A1* | 8/2011 | Rezk | G01S 17/325 356/5.09 |

* cited by examiner

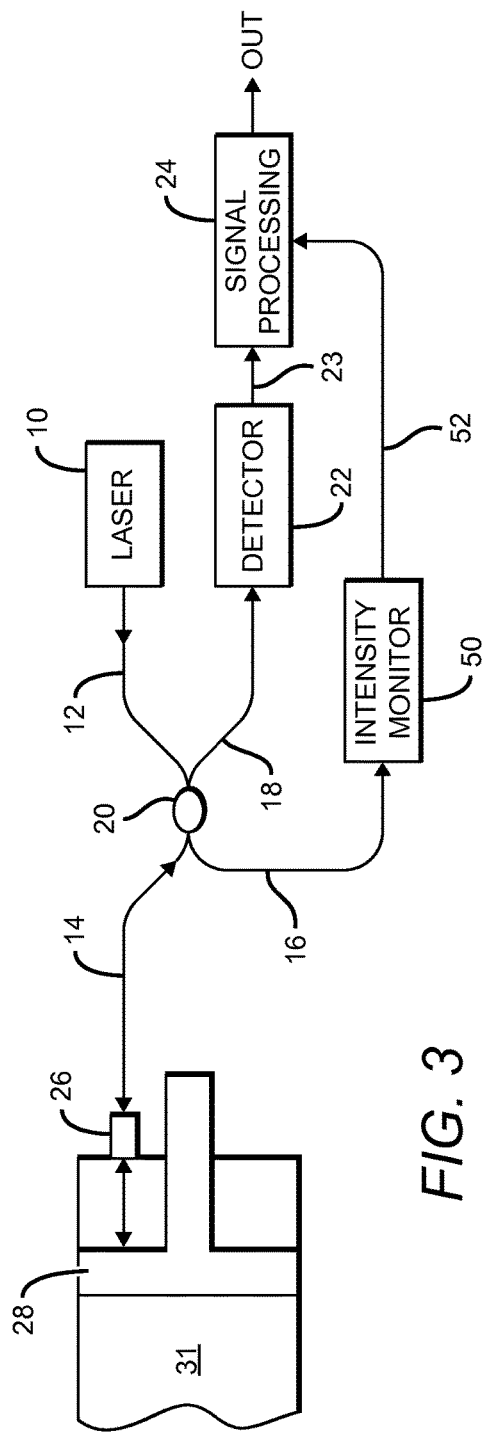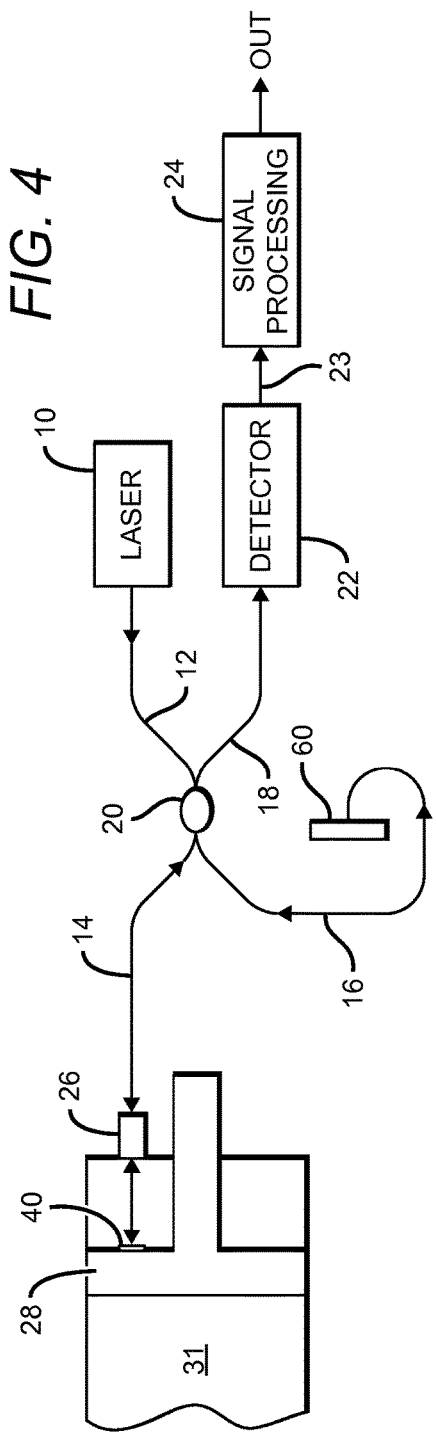

FIBER OPTIC SYSTEM FOR SENSING THE POSITION OF A HYDRAULIC ACCUMULATOR PISTON

RELATED APPLICATIONS

This application is a Divisional of U.S. utility application Ser. No. 13/441,272, filed Apr. 6, 2012, still pending, the contents of which are herein incorporated by reference in their entirety.

BACKGROUND OF THE INVENTION

Field of the Invention

This invention relates generally to position sensing systems and, more particularly, to position sensing systems employing fiber optics.

Description of the Related Art

It is often necessary to determine the position of a system component which moves when in operation. For example, the position of a piston within a hydraulic accumulator can be used to determine the volume of fluid within the accumulator.

There are many ways in which position can be determined. For example, in a hydraulic accumulator system as described above, an electrical limit switch within the accumulator might be triggered by an end cap on the moving piston. Alternatively, the position might be determined using a camera trained on the piston, or by using ultrasonic or magnetic means. However, measurement devices installed within the accumulator in this way may prove to be unreliable in an environment that may corrosive or subject to excessive vibration.

SUMMARY OF THE INVENTION

A fiber optic sensing system for determining the position of an object is presented, which overcomes the problems noted above.

The present system requires a light source, an optical fiber, a fiber optic splitter, a fiber tip lens, an optical detector and signal processing circuitry. These components are arranged such that light emitted by the light source is conveyed via optical fiber and the fiber optic splitter to the fiber tip lens and onto an object, the position of which is to be determined, such that at least a portion of the light conveyed onto the object is reflected by the object and conveyed via optical fiber and the splitter to the optical detector. Signal processing circuitry coupled to the optical detector determines the position of the object with respect to the fiber tip lens, based at least in part on a characteristic of the reflected light.

The light source is preferably a laser, and the position of the object might be determined using any of several different characteristics of the reflected light. For example, the light source could be arranged to emit pulses of light, and the signal processing circuitry arranged to measure the time required for a given pulse to travel from the light source to the object and back to the optical detector; the measured time will vary with the distance of the object from the fiber tip lens. The signal processing circuitry might also be arranged to compare the intensity of the light emitted by the light source with the intensity of the light reflected by the object; here, the difference between the intensities varies with the distance of the object from the fiber tip lens.

Another possible embodiment has the system components arranged to form a Michelson interferometer in which the light emitted by the light source is split by the optical splitter into a component that is conveyed to the object and a component which is conveyed via an optical fiber of fixed length to a reflective surface. Light reflected by the object and light reflected by the reflective surface are then recombined, such that the resulting interference pattern varies with the distance of the object from the fiber tip lens.

The present system is suitably employed with a hydraulic accumulator having a piston that varies with the volume of hydraulic fluid contained in the accumulator. The fiber optic sensing system determines the position of the surface of the piston, from which the volume can be calculated.

These and other features, aspects, and advantages of the present invention will become better understood with reference to the following drawings, description, and claims.

BRIEF DESCRIPTION OF THE DRAWINGS

FIG. 3 is a block diagram of an embodiment of a fiber optic sensing system in accordance with the present invention which employs a "loss measurement" measurement method.

FIG. 4 is a block diagram of an embodiment of a fiber optic sensing system in accordance with the present invention which employs an "interferometric" measurement method.

DETAILED DESCRIPTION OF THE INVENTION

Figure 1:
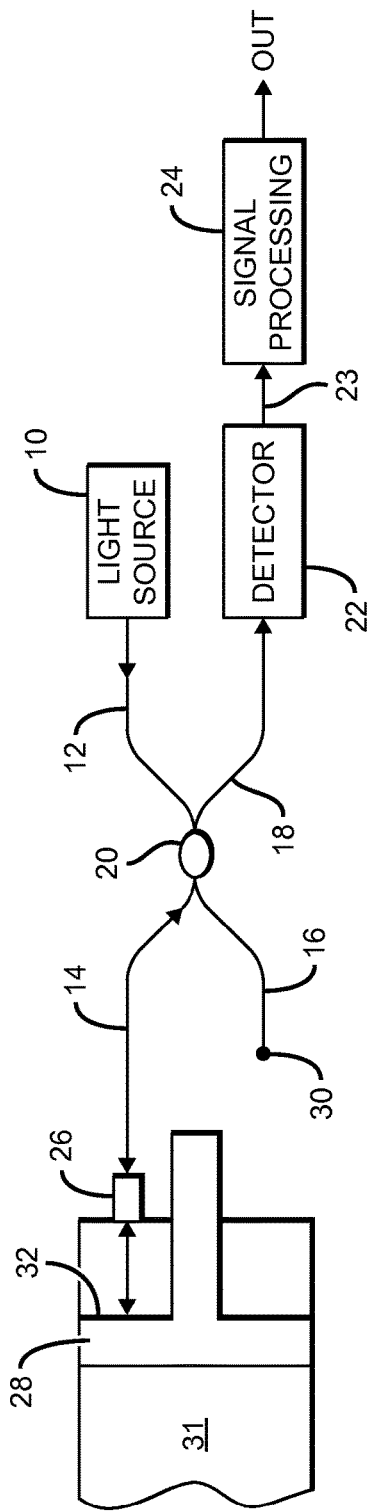
FIG. 1 is a block diagram of a fiber optic sensing system in accordance with the present invention.

FIG. 1 is a block diagram of a fiber optic sensing system for determining the position of an object in accordance with the present invention. The system includes a light source 10, optical fibers 12, 14, 16, 18, a fiber optic splitter 20, an optical detector 22, and signal processing circuitry 24. The components are arranged such that light emitted by light source 10 is conveyed via optical fiber (here, fibers 12 and 14) and optical splitter 20 to a fiber tip lens 26 and onto an object 28, the position of which is to be determined. The fiber tip lens is arranged such that at least a portion of the light conveyed onto the object is reflected by the object and conveyed via optical fiber (here, fibers 14 and 18) and splitter 20 to optical detector 22, which detects the reflected light. Signal processing circuitry 24 is coupled to the output 23 of optical detector 22 and arranged to determine the position of object 28 with respect to the fiber tip lens, based at least in part on a characteristic of the reflected light. The unused branch of splitter 20 (fiber 16) should end at a termination 30.

The object 28 may be anything that is capable of or can be made capable of reflecting light, such as a valve component or the surface of a fluid. The application illustrated in FIG. 1 (and all subsequent figures) is that of a hydraulic accumulator 31, in which the position of a piston or bladder 28 (referred to herein as a piston) varies with the volume of fluid in the accumulator. Here, light from fiber tip lens 26, which is installed in a feed-through in the accumulator housing, is reflected off of the top surface 32 of the piston to determine its position with respect to the lens. Assuming that 1) the fiber tip lens is mounted in a fixed location on the accumulator, 2) the piston serves as the top of the accumulator, and 3) the accumulator's other dimensions are known, determining the position of the piston with respect to the lens enables the volume of fluid within the accumulator to be calculated.

The present system provides a number of advantages over prior art systems. For example, the system provides a direct measurement of position passively—i.e., without requiring that any electronic components be near the object or, as here, within the accumulator. This also makes this approach corrosion-resistant, and enables the system to operate despite being subjected to, for example, electromagnetic or magnetic interference, vibration including ultrasonic vibration, heat and high pressures.

Light source 10 is preferably a laser with a long coherence length, and fiber tip lens 26 is preferably a collimator. Light conveyed onto the object may be scattered by the object surface on which it impinges (and/or by contaminants or fluids between the lens and the object), or reflected by means of specular reflection. The surface might also be retroreflective, or a retroreflective surface such as a retroreflective tape (40 in FIG. 2, discussed below) may be affixed to the object such that light conveyed onto the object impinges on the retroreflective surface and is reflected by means of retroreflection; this tends to improve the system's signal-to-noise ratio. The optical fibers are preferably bi-directional; this is essential for fiber 14.

Figure 2:
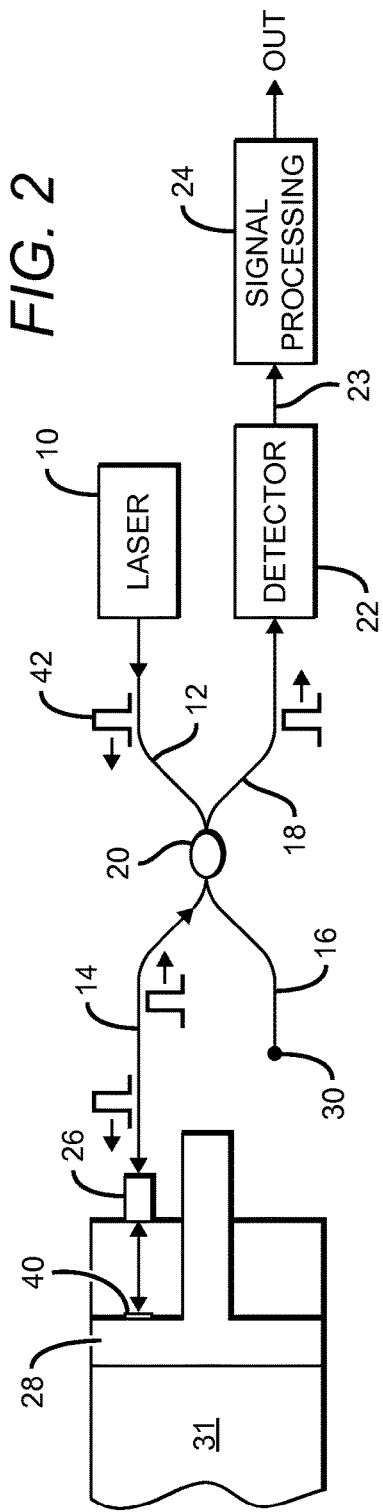
FIG. 2 is a block diagram of an embodiment of a fiber optic sensing system in accordance with the present invention which employs a "time of flight" measurement method.

One possible characteristic of the reflected light that can be used to determine position is the time required for light to travel from the light source to the detector. As illustrated in FIG. 2, this "time of flight" measurement method may be accomplished by having light source 10 arranged to emit pulses of light 42, with signal processing circuitry 24 arranged to measure the time required for a given pulse to travel from light source 10 to object 28 and back to optical detector 22. The transit time of this pulse will vary with the distance of object 28 from fiber tip lens 26, and thus can be used to determine the object's position with respect to the lens. Since the transit time will typically vary only slightly with position, the use of a narrow pulse and fast measurement equipment, such as that involving electro-optic intensity modulator devices, which can operate at bandwidths of several tens of Gigahertz, are recommended when highly accurate results are needed.

Another possible characteristic of the reflected light that might be used to determine position is intensity. As illustrated in FIG. 3, for this "loss measurement" measurement method, signal processing circuitry 24 is arranged to compare the intensity of the light emitted by light source 10 with the intensity of the light reflected by object 28, with the difference between the intensities varying with the distance of the object from fiber tip lens 26. This can be accomplished by, for example, coupling a light intensity monitor 50 to the end of optical fiber 16, which serves to measure the intensity of the light emitted by light source 10 and thus provide a reference signal 52 to be compared to the intensity of the reflected light. The reference signal output 52 of monitor 50 and the output 23 from detector 22 are fed to signal processing circuitry 24, so that the comparison of intensities can be performed and the position of object 28 determined based on the results.

The position of object 28 might also be determined by "interferometric" means, which tend to provide highly accurate measurements; one possible embodiment is shown in FIG. 4. For this measurement method, the system components form a Michelson interferometer in which the light emitted by light source 10—which must be a laser with a coherence length compatible with the differential leg length of the Michelson interferometer—is split by optical splitter 20 into a component that is conveyed to object 28 and a component which is conveyed via an optical fiber (here, fiber 16) to a reflective surface 60 such as a mirror. Object 28 preferably includes a retro-reflecting surface 40, which may be necessary to obtain an adequate signal-to-noise ratio. Light reflected by object 28 and light reflected by reflective surface 60 are recombined such that the resulting interference pattern varies with the distance of the object from fiber tip lens 26. For this implementation of the interferometric method, light source 10 is a laser, one of the arms of the interferometer—here, optical fiber 16—has a fixed length, and the other arm of the interferometer—consisting of fiber 14, lens 26, and the distance between lens 26 and object 28, has a length which varies with the distance between lens 26 and object 28, thereby causing the interference pattern to vary with the distance of the object from the fiber tip lens. The signal processing unit 24 preferably has the capability and bandwidth for counting interference fringes as they pass over detector 22; the number of fringes counted will provide a digital readout of the magnitude of any movement of the piston 28.

Figure 5:
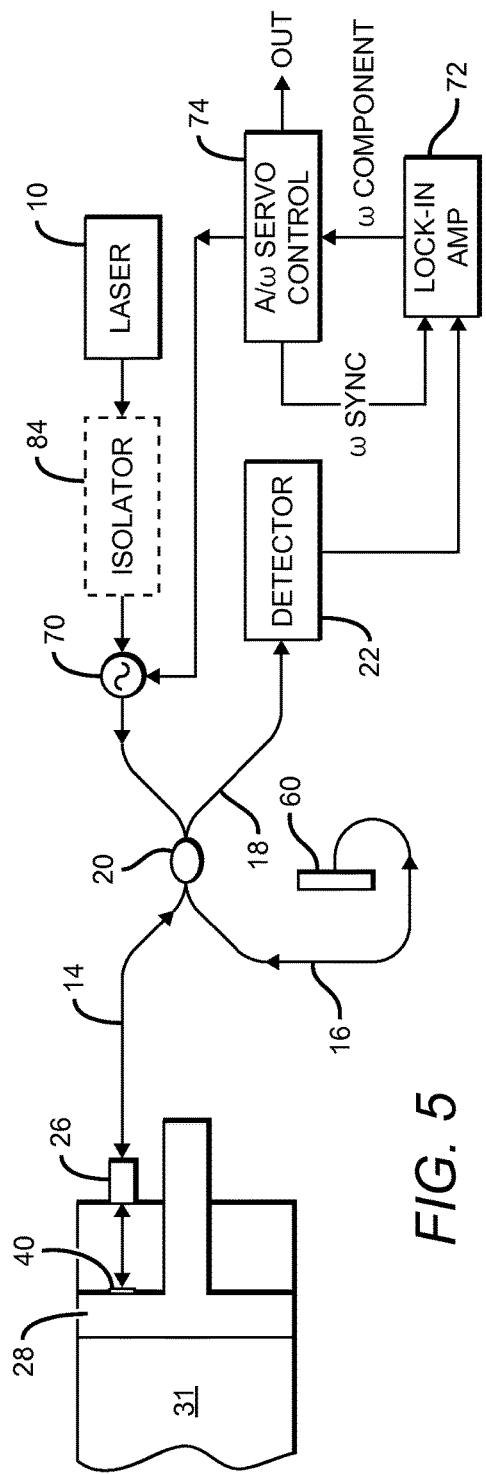
FIG. 5 is a block diagram of an embodiment of a fiber optic sensing system in accordance with the present invention which employs another possible "interferometric" measurement method in which the laser light is phase modulated.

Another possible implementation that uses an interferometric measurement method is shown in FIG. 5. Here, a phase modulator 70 is inserted between laser 10 (and preferably an isolator 84) and optical splitter 20 and arranged to sinusoidally modulate the phase of the light emitted by the laser, by means of a fiber stretcher or lithium niobate crystal, for example. One branch (14) of splitter 20 is routed to the object 28 via lens 26, where it is preferably reflected with retro-reflecting tape 40; this light path forms one leg of a Michelson interferometer. The other branch (16) is routed to a reflective surface 60 such as a Faraday mirror, and serves as the second leg of the Michelson interferometer. Light reflected from the object is conveyed to detector 22 via splitter 20 and fiber 18. Here, the signal processing circuitry includes a lock-in amplifier 72 and an "A/ω servo control" circuit 74, which can servo the amplitude A of the modulation or the frequency ω of the modulation (or both).

The return light is split and interferes with the light from the second leg of the interferometer, resulting in an interference signal which is registered on detector 22. The output of detector 22 is provided to lock-in amplifier 72, which extracts the amplitude of the frequency component ω (first harmonic) of the detected interference signal and sends it to A/ω servo control circuit 74.

The amplitude of the first harmonic (at ω) of the detector output signal is proportional to the first order Bessel function $J1(\beta)$, where the modulation index $\beta$ is given by:

$$\beta = \frac{n \cdot A \cdot \omega \cdot \Delta L}{c}$$

where n=the refractive index of the glass fiber, A=the amplitude of the phase modulation, ω=the frequency of the phase modulation, ΔL=the interferometer differential path length, and c=the velocity of light in vacuo. Thus, the first-harmonic amplitude depends linearly on the interferometer leg length (which varies with the position of object 28), the modulation amplitude and the modulation frequency. The modulation depth β is suitably chosen to be such that this first-harmonic amplitude is zero (which occurs for β=3.832). Then, if the interferometer leg length changes, the values of the modulation frequency or modulation amplitude or both can be changed to compensate.

When so arranged, servo circuit 74, which preferably controls both the amplitude A and the frequency ω of the phase modulation, adjusts either the modulation frequency or amplitude (or both) to make the first harmonic component equal to zero in amplitude. It is preferred to adjust the modulation frequency, which is easier to monitor digitally with a counter. The value of this modulation frequency (or modulation amplitude, if that is varied) represents the position of the object.

Figure 6:
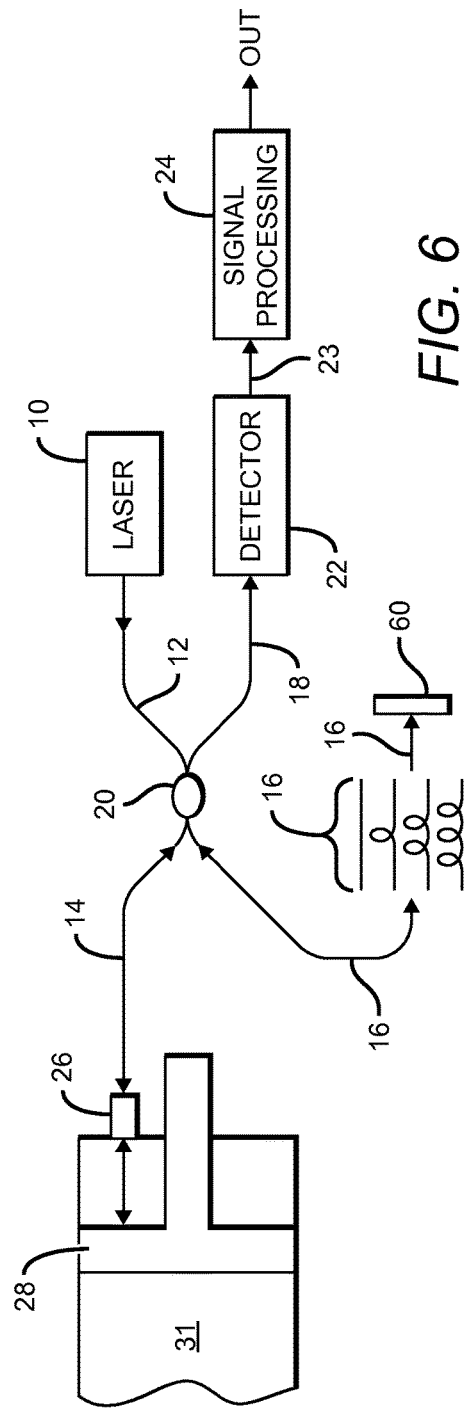
FIG. 6 is a block diagram of an embodiment of a fiber optic sensing system in accordance with the present invention which employs another possible "interferometric" measurement method.

Another possible implementation that uses an interferometric measurement method is shown in FIG. 6. This is similar to the configuration shown in FIG. 4, except that the length of one of the arms of the interferometer—here, optical fiber 16—is arranged to be adjustable as needed to obtain a desired interference pattern. For this case, the length of fiber 16 needed to obtain the desired interference pattern varies with the distance of the object from fiber tip lens 26. For this implementation, the light source is preferably spectrally broadband, with a short coherence length. The adjustable length fiber might be provided by any number of means. For example, fibers having different fixed lengths might be provided as shown in FIG. 6, each of which can be selectively switched into fiber 16 to vary the fiber length. Another possibility would be to affix fiber 16 around a PZT cylinder such that a voltage applied to the cylinder causes the length of fiber 16 to vary, or for longer length variations, to incorporate a collimated free-space section that could be varied in length.

Figure 7:
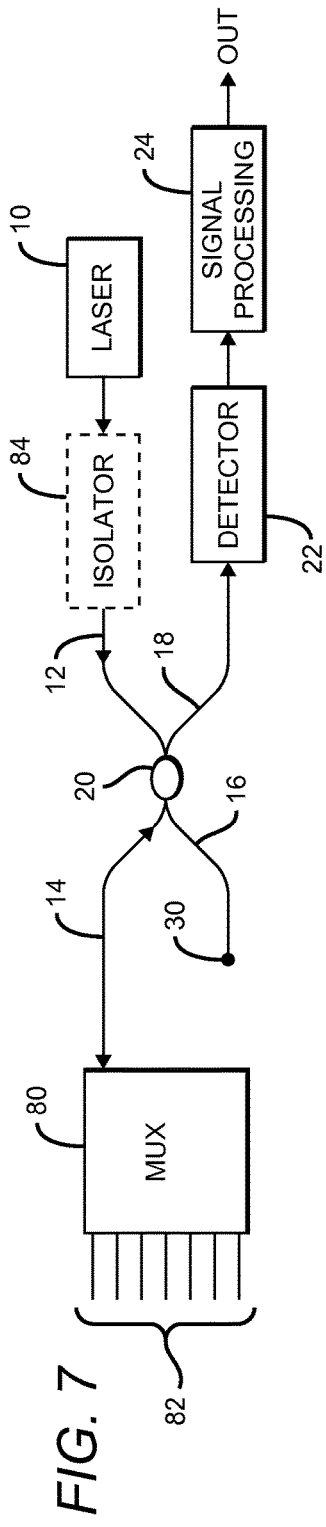
FIG. 7 is a block diagram of an embodiment of a fiber optic sensing system in accordance with the present invention which includes a multiplexing feature.
Figure 8:
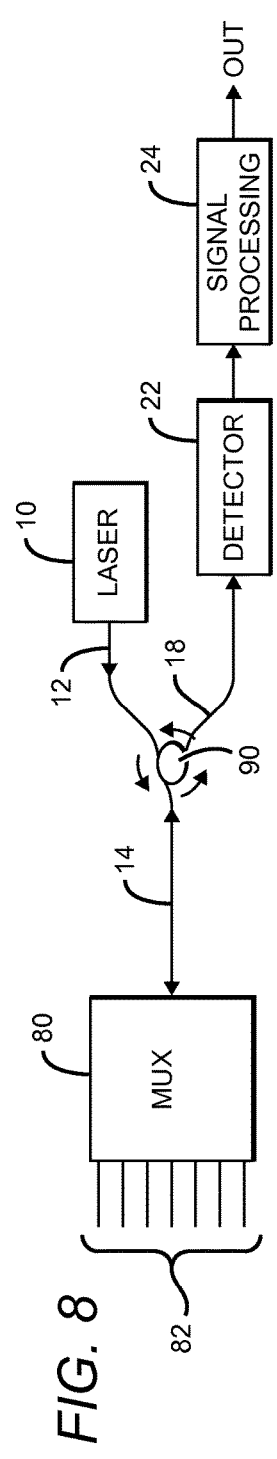
FIG. 8 is a block diagram of another embodiment of a fiber optic sensing system in accordance with the present invention which includes a multiplexing feature.

The present fiber optic sensing system might also include a time-multiplexing means such that the positions of a plurality of objects can be determined using a single light source, a single fiber optic splitter, a single optical detector, and a single signal processing circuit. One possible implementation is shown in FIG. 7. This configuration is similar to that shown in FIG. 1, except that optical fiber 14 is coupled to a multiplexing circuit 80 such as a 1×X splitter/coupler or a 1×X sequential optical switch; X is 7 in FIG. 7 (and in FIG. 8), but could be any desired number. Then, the ports 82 of multiplexing circuit 80 could be coupled to respective fiber lens tips to measure respective positions one at a time. The system might also include an isolator 84, to prevent light reflecting back into the laser cavity and causing instabilities.

One problem with a system as shown in FIG. 7 is that, between the light that ends up at termination 30 and the reflected light that ends up directed back towards laser 10 instead of detector 22, perhaps 50% of the light provided by laser 10 is wasted. The embodiment shown in FIG. 8 helps to overcome these problems. Here, the optical splitter is implemented with an optical circulator 90 as shown. With this arrangement, there is nominally no wasted light. One possible application of a multiplexed system as discussed above might be, for example, an oil rig that has multiple blowout preventers, each of which includes a piston that needs to be monitored. A single multiplexed system as discussed herein could be used to monitor the positions of each piston, in a recurring sequence.

Figure 9:
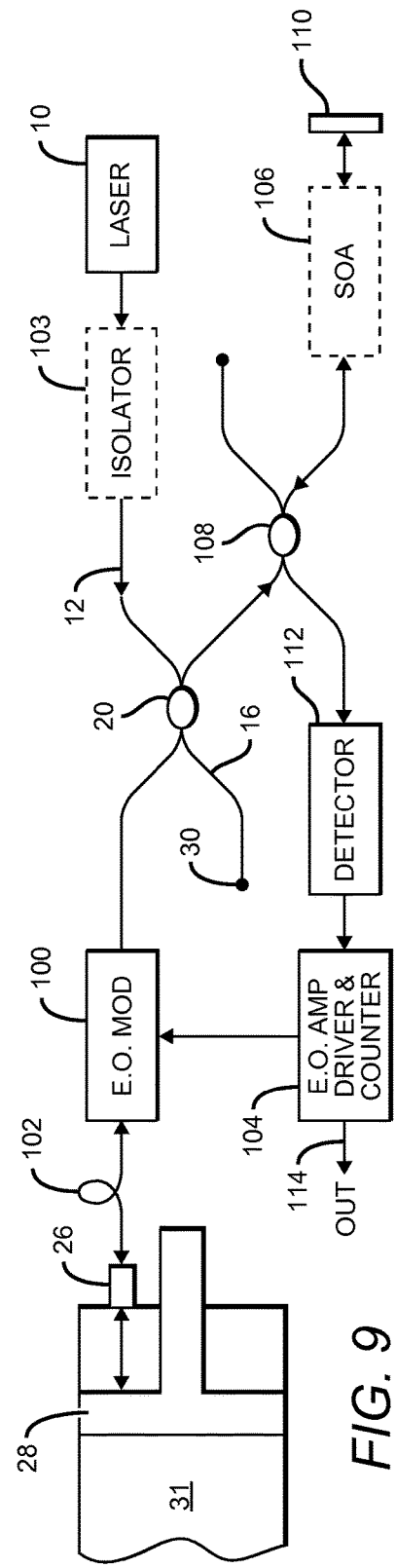
FIG. 9 is a block diagram of an embodiment of a fiber optic sensing system in accordance with the present invention which employs an electro-optical modulator.

Another possible embodiment, which employs an electro-optical modulator to facilitate a "time of flight" measurement approach, is shown in FIG. 9. Laser 10, preferably a continuous laser, emits light that is routed via fiber 12 and optical splitter 20 to an electro-optical modulator 100, and from there via an optical fiber 102 to object 28; the system might also include an isolator 103. The modulator is pulsed by a servoed driver circuit 104 at a rate commensurate with the return time for the light going to the object and back to the modulator. If the timing is right, the returning light pulses will again pass through modulator 100, and then preferably to a semiconductor optical amplifier (SOA) 106 via one leg of a second optical splitter 108, the other leg of which is terminated. A mirror 110 reflects the light from the SOA back through the SOA; this double-pass through the SOA amplifies the light, which then passes through splitter 108 to a detector 112. This arrangement creates an electro-optical servo loop which automatically adjusts the pulsing rate for the electro-optical intensity modulator 100 to maximize the signal on detector 112 so that light can pass in both directions through the modulator 100. In this manner the frequency of the modulator pulsing, which can be acquired digitally at position 114 by pulse counting, indicates the time-of-flight of the light and gives a readout of the piston 28 position.

The length of optical fiber 102 can be adjusted to make the light return time convenient for the electronic circuitry. If the fiber length is, for example, 100 meters, then the nominal frequency for the pulsing will be around 1 MHz. Then, assuming that the maximum travel distance for object 28 is 60 cm, a 1 mm position change for the object will correspond to a change in the modulator frequency of about 1.7 kHz, which should be relatively easy to detect. The frequency of the pulsing can be used to establish a time window during which the system looks for a reflection, which can be used to exclude unwanted returns to within the pulse length governed by the bandwidth of modulator 100.

The ability to detect the maximum signal at the correct frequency is improved as the length of the light pulse passing through modulator 100 is made smaller. A pulse length value of 40 picoseconds is suitable for currently available electro-optical modulators (30 GHz bandwidth). The SOA 106 can be operated in continuous mode, or, if noise is a problem (possibly from leakage through modulator 100), the SOA can be pulsed on and off.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A fiber optic sensing system for determining the position of a piston in a hydraulic accumulator, comprising:
   a single light source;
   a fiber optic splitter;
   a fiber tip lens;
   an optical detector; and
   signal processing circuitry;

said system arranged such that light emitted by said single light source is conveyed via optical fiber and said fiber optic splitter to said fiber tip lens installed in a fixed location on a hydraulic accumulator having an associated piston and onto said piston, the position of which is to be determined, and such that at least a portion of said light conveyed onto said piston is reflected by said piston and conveyed via optical fiber and said fiber optic splitter to said optical detector;

said signal processing circuitry coupled to said optical detector and arranged to determine the position of said piston with respect to said fiber tip lens based at least in part on a characteristic of said reflected light;

wherein said system components form a Michelson interferometer in which the light emitted by said single light source is split by said fiber optic splitter into a component that is conveyed to said piston via an optical fiber and said fiber tip lens forming a first arm and a component which is conveyed via an optical fiber directly to a reflective surface a fixed length from said fiber optic splitter, such that light reflected by said piston passes through said fiber tip lens and is directly conveyed from said fiber tip lens to said fiber optic splitter via said first arm and light reflected by said reflective surface is conveyed directly back to said fiber optic splitter, said light directly conveyed from said fiber tip lens and from said reflective surface to said fiber optic splitter recombined such that the resulting interference pattern varies with the distance of said piston from said fiber tip lens.

2. The system of claim 1, wherein said single light source is a single laser and one of the arms of the interferometer has a fixed length.

3. The system of claim 2, further comprising a phase modulator arranged to modulate the phase of said light emitted by said laser, said signal processing circuitry coupled to said phase modulator and arranged to adjust the frequency and/or the amplitude of said phase modulation such that the position of said piston with respect to said fiber tip lens can be determined based on the interference pattern registered on said optical detector.

4. The system of claim 3, wherein said signal processing circuitry is arranged to determine the amplitude of the first harmonic component $\omega$ present in the output of said optical detector, and to adjust the frequency and/or the amplitude of said phase modulation such that the amplitude of said first harmonic component is made equal to zero.

5. The system of claim 1, wherein said light emitted by said light source is spectrally broadband with a short coherence length, and the length of one of the arms of the interferometer is arranged to be adjustable.

6. A fiber optic sensing system for determining the position of a piston in a hydraulic accumulator, comprising:
   a single laser;
   a phase modulator arranged to modulate the phase of said light emitted by said single laser;
   a fiber optic splitter;
   a fiber tip lens;
   an optical detector; and
   signal processing circuitry coupled to said optical detector and to said phase modulator;
   said system components arranged to form a Michelson interferometer in which the phase-modulated light is split by said fiber optic splitter into a component that is conveyed via a first arm and said fiber tip lens installed in a fixed location on a hydraulic accumulator having an associated piston and onto said piston, and a component which is conveyed via an optical fiber to a reflective surface a fixed length from said fiber optic splitter via a second arm, and such that light reflected by said piston passes through said fiber tip lens and is directly conveyed from said fiber tip lens to said fiber optic splitter via said first arm and light reflected by said reflective surface is directly conveyed to said fiber optic splitter via said second arms, said light directly conveyed from said fiber tip lens and from said reflective surface to said fiber optic splitter recombined such that the resulting interference pattern varies with the distance of said piston from said fiber tip lens; and
   said signal processing circuitry arranged to adjust the frequency and/or the amplitude of said phase modulation such that the position of said piston with respect to said fiber tip lens can be determined based on the interference pattern registered on said optical detector.

7. The system of claim 6, wherein said signal processing circuitry is arranged to determine the frequency of the first harmonic component $\omega$ present in the output of said optical detector, and to adjust the frequency and/or the amplitude of said phase modulation such that the amplitude of said first harmonic component is made equal to zero.

8. The system of claim 6, further comprising an isolator between said single laser and said phase modulator.

9. The system of claim 6, wherein said single laser has a coherence length compatible with the difference in length between said first and second arms of said Michelson interferometer.

* * * * *